(12) United States Patent
Rousseau et al.

(10) Patent No.: US 9,170,978 B2
(45) Date of Patent: Oct. 27, 2015

(54) DATA CENTER ACTIVATION AND CONFIGURATION

(71) Applicant: Verizon Patent and Licensing Inc., Basking Ridge, NJ (US)

(72) Inventors: John Rousseau, Burlington, MA (US); Seshubabu Pasam, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 286 days.

(21) Appl. No.: 13/968,970

(22) Filed: Aug. 16, 2013

(65) Prior Publication Data

US 2015/0052228 A1    Feb. 19, 2015

(51) Int. Cl.
*G06F 15/16* (2006.01)
*G06F 15/177* (2006.01)
*H04L 29/06* (2006.01)

(52) U.S. Cl.
CPC .............. *G06F 15/177* (2013.01); *H04L 67/42* (2013.01)

(58) Field of Classification Search
CPC .............................. G06F 15/177; H04L 67/42
USPC .................................. 709/200–203, 217–227
See application file for complete search history.

(56) References Cited

U.S. PATENT DOCUMENTS

| 7,089,317 | B2 * | 8/2006 | Jeyaraman et al. | 709/230 |
| 8,892,712 | B2 * | 11/2014 | Kuchibhotla et al. | 709/223 |
| 2013/0117441 | A1 * | 5/2013 | Kuchibhotla et al. | 709/224 |
| 2013/0282802 | A1 * | 10/2013 | Tanimoto | 709/203 |
| 2014/0040449 | A1 * | 2/2014 | Kinoshita et al. | 709/223 |
| 2014/0317247 | A1 * | 10/2014 | Sudhoff-Ewers et al. | 709/220 |

\* cited by examiner

*Primary Examiner* — Moustafa M Meky

(57) ABSTRACT

A device is configured to receive, from a source device, activation information associated with a set of server devices, to cause a first server device, of the set of server devices, to be activated based on the activation information. The device is configured to receive, from the source device, configuration information associated with the set of server devices. The device is configured to activate and configure at least one other server device, of the set of server devices, based on the activation information and the configuration information.

20 Claims, 11 Drawing Sheets

DATA CENTER ACTIVATION AND CONFIGURATION

BACKGROUND

Computing devices, such as server devices, telecommunications devices, storage devices, or the like, may be housed in a single location (e.g., a "data center"). The computing devices may be networked into a single system to receive, store, and/or provide information.

DETAILED DESCRIPTION OF PREFERRED EMBODIMENTS

The following detailed description of example implementations refers to the accompanying drawings. The same reference numbers in different drawings may identify the same or similar elements.

A data center may include a cluster of computing devices, such as server devices, acting together to store, manage, and disseminate information. A subset of the server devices may be dedicated to different tasks, such as orchestration, storage management, to act as virtual machines, to run hypervisors, or the like. To bring a data center online, the server devices must be activated and configured, with the necessary operating systems and software installed on each of the server devices. A source device, such as a computing device, may individually activate and configure the server devices. However, a data center may include a large quantity of server devices (e.g., hundreds of server devices, thousands of server devices, etc.), and individually activating and configuring each server device using the source device may be time intensive. Implementations described herein may allow a source device to activate a first server device so that the first server device may activate and configure the remaining server devices without the use of the source of the device.

Figure 1:
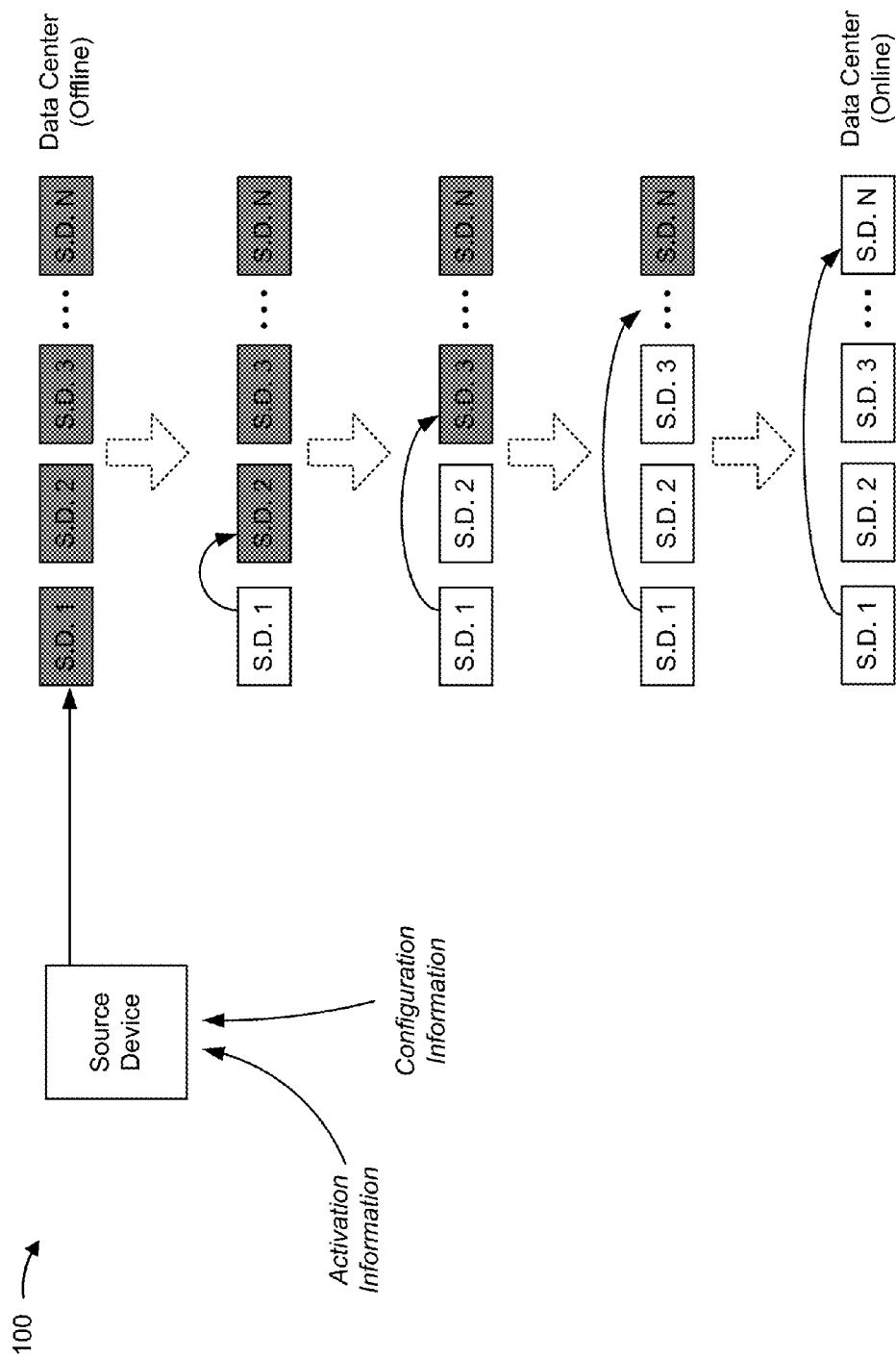
FIG. 1 is a diagram of an overview of an example implementation described herein.

FIG. 1 is a diagram of an overview of an example implementation 100 described herein. As shown in FIG. 1, example implementation 100 may include a source device and a set of server devices (identified as S.D. 1 through S.D. N) to be activated and configured as a data center.

As shown in FIG. 1, the source device may receive activation information and configuration information. The activation information may include information for initializing the set of server devices, such as a boot program, an operating system, or the like. The configuration information may include information for provisioning the set of server devices to accomplish various functions, such as orchestration, storage management, or the like. Based on the activation information, the source device may activate a first server device (e.g., "S.D. 1"), of the set of server devices, and may provide the activation information and the configuration information to the first server device. The first server device may store the activation information and the configuration information (e.g., on a data structure associated with the first server device).

As further shown in FIG. 1, the first server device may activate a second server device (e.g., "S.D. 2"), of the set of server devices, based on the activation information. Likewise, the first server device may activate a third server device (e.g., "S.D. 3"), of the set of server devices, based on the activation information. In this manner, the first server device may activate the set of server devices. Based on the configuration information, the first server device may configure the set of server devices by allocating a subset of server devices for orchestration, a subset of the server devices for storage management, a subset of the server devices to act as virtual machines, etc. In this manner, the first server device may activate and configure the remaining server devices in the set of server devices (e.g., may bring the data center online) without the source device being involved.

Figure 2:
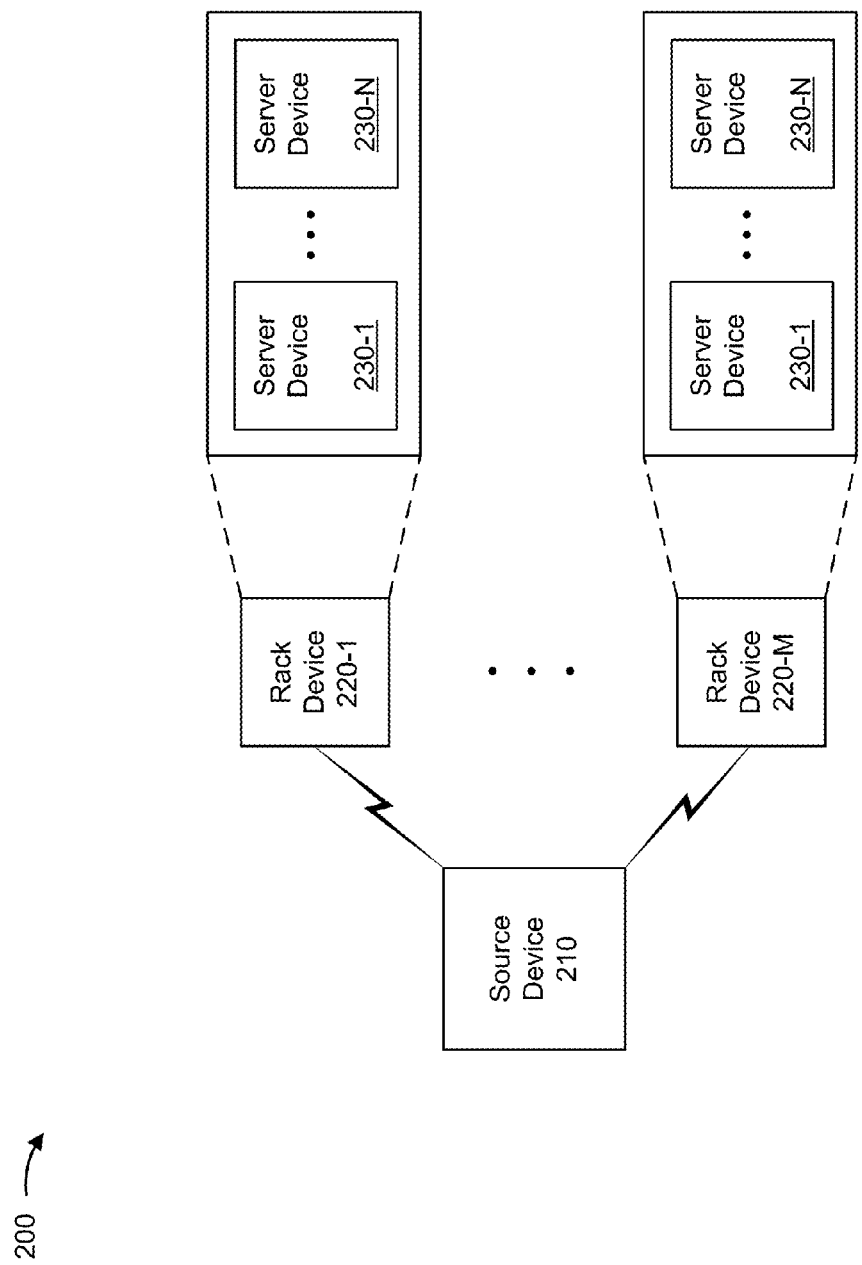
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a source device 210, rack devices 220-1 . . . 220-M (M≥1) (hereinafter referred to collectively as "rack devices 220," and individually as "rack device 220"), and server devices 230-1 . . . 230-N (N≥1) (hereinafter referred to collectively as "server devices 230," and individually as "server device 230"). Devices of environment 200 may interconnect via wired connections, wireless connections, or a combination of wired and wireless connections.

Source device 210 may include a device capable of activating a server device, and providing activation information and configuration information to a server device. For example, source device 210 may include a computing device, such as a server, a desktop computer, a laptop computer, a tablet computer, a handheld computer, or a similar device. Source device 210 may receive information from and/or transmit information to rack device 220 and/or server device 230 (e.g., information associated with activating and configuring a data center).

Rack device 220 may include a device capable of receiving, storing, processing, and/or transmitting information, such as information associated with a data center. For example, rack device 220 may include a chassis (e.g., a cluster, a rack, etc.) of computing devices (e.g., a server, a desktop computer, a laptop computer, a tablet computer, a handheld computer, etc.). In some implementations, rack device 220 may include sixty-four server devices 230. In some implementations, rack device 220 may include a greater quantity or a lesser quantity of server devices 230. Rack device 220 may receive information from and/or transmit information to source device 210 and/or server device 230.

Rack device 220 may host server device 230. Sever device 230 may include one or more devices capable of receiving, storing, processing, and/or transmitting information, such as information necessary to activate and/or operate a cluster of server devices 230 (e.g., a data center). For example, server device 230 may include a computing device, such as a server, a desktop computer, a laptop computer, a tablet computer, a handheld computer, or a similar device. Server device 230 may receive information from and/or transmit information to source device 210 and/or rack device 220.

The number of devices shown in FIG. 2 is provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
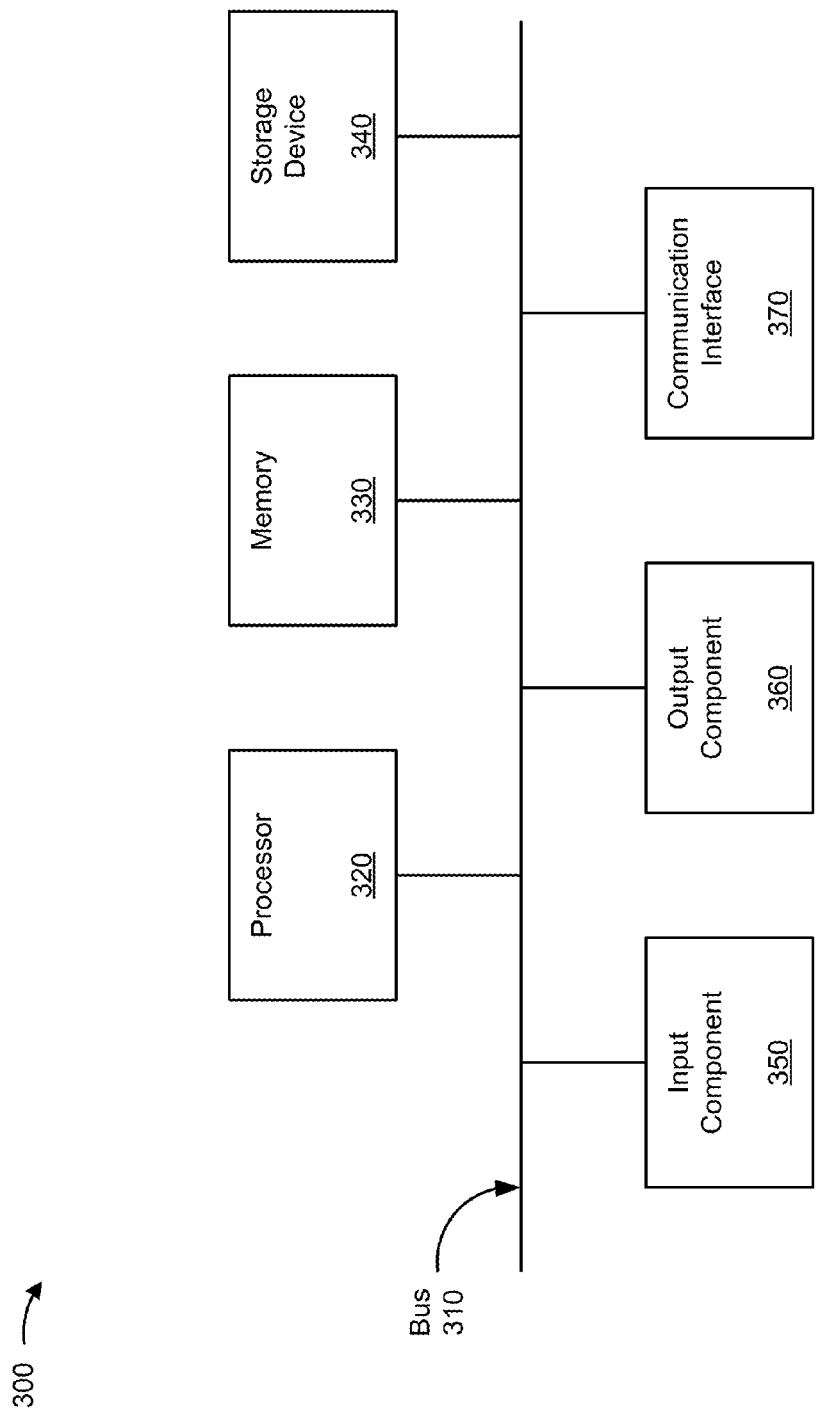
FIG. 3 is a diagram of example components of one or more devices of FIG. 2.

FIG. 3 is a diagram of example components of a device 300. Device 300 may correspond to source device 210, rack device 220, and/or server device 230. Additionally, or alternatively, each of source device 210, rack device 220, and/or server device 230 may include one or more devices 300 and/or one or more components of device 300. As shown in FIG. 3, device 300 may include a bus 310, a processor 320, a memory 330, a storage device 240, an input component 350, an output component 360, and a communication interface 370.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Storage device 340 may store information and/or software related to the operation and use of device 300. For example, storage device 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes ("LEDs"), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 370. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4A:
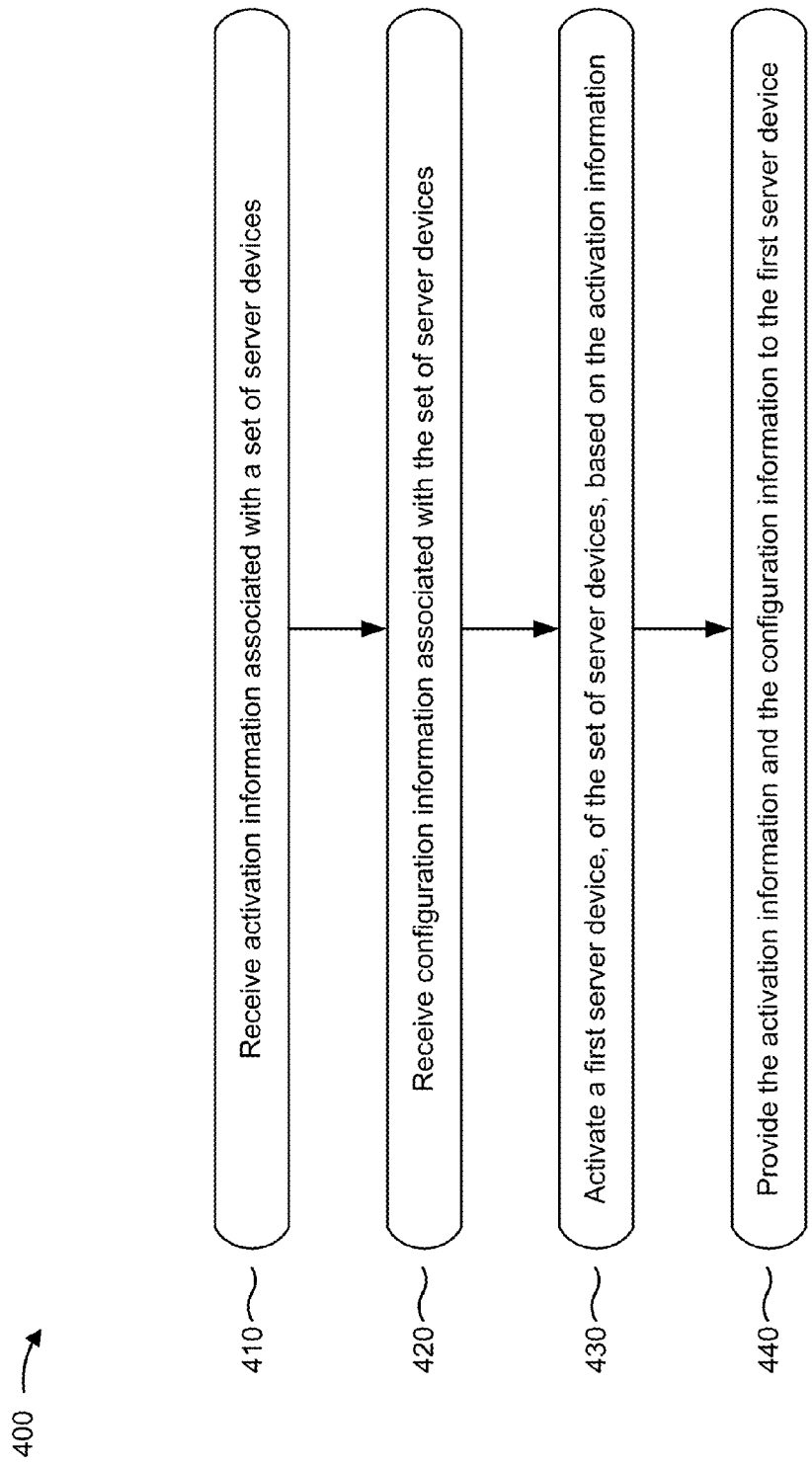
FIGS. 4A and 4B are flow charts of example processes for activating and configuring a set of server devices.

FIG. 4A is a flow chart of an example process 400 for activating and configuring a server device. In some implementations, one or more process blocks of FIGS. 4A and 4B may be performed by source device 210. Additionally, or alternatively, one or more process blocks of FIG. 4A may be performed by another device or a group of devices separate from or including source device 210, such as rack device 220 and/or server device 230.

As shown in FIG. 4A, process 400 may include receiving activation information associated with a set of server devices (block 410). For example, source device 210 may receive the activation information associated with a set of server devices 230 from a computing device, a server device, or the like. Additionally, or alternatively, source device 210 may receive the activation information from a data structure associated with source device 210 (e.g., source device 210 may access the activation information stored on the data structure).

In some implementations, the activation information may include information used to activate server device 230. For example, the activation information may include a set of operations that allow server device 230 to initialize (e.g., boot information). For example, the activation information may include operations that allow server device 230 to power on, to activate processor 320, to activate memory 330, to install software, or the like. In some implementations, the activation information may include a preboot execution environment ("PXE") for booting server device 230 by use of a network interface (e.g., processor 320, a computer card, etc.) independently from a storage device (e.g., storage device 340).

In some implementation, the activation information may include one or more protocols for initializing, activating, and/or operating server device 230. For example, the activation information may include a hypertext transfer protocol daemon ("HTTPD") to allow for transfer of hypermedia (e.g., text, audio, video, graphics, etc.) associated with hyperlinks, a dynamic host configuration protocol ("DHCP") to allow server devices 230 to communicate via a network using internet protocol ("IP"), a trivial file transfer protocol ("TFTP") to allow source device 210 to transfer information (e.g., boot information) to server device 230, an extended TFTP to allow source device 210 to transfer information greater than a threshold size (e.g., greater than a threshold quantity of megabytes) or the like.

In some implementations, the activation information may include software for facilitating installation of one or more operating systems, such as cobbler. Additionally, or alternatively, the activation information may include information associated with a programming language (e.g., Python, ColdFusion, Perl, PHP: Hypertext Preprocessor, C, C++, Java, Erlang, Scala, etc.).

As further shown in FIG. 4A, process 400 may include receiving configuration information associated with the set of server devices (block 420). For example, source device 210 may receive the configuration information, associated with server devices 230, from a computing device, a server device, or the like. Additionally, or alternatively, source device 210 may receive the configuration information from a data structure associated with source device 210 (e.g., source device 210 may access the activation information stored on the data structure).

In some implementations, the configuration information may include information that identifies how server devices 230 and/or rack devices 220 are to be provisioned. For example, the configuration information may include information that identifies which server devices 230 and/or which rack devices 220 are to be dedicated to a task, such as orchestration, storage management, networking, or the like. Additionally, or alternatively, the configuration information may include information that identifies how many processors 320 to allocate to the task, how many storage devices 340 to allocate to the task, etc.

In some implementations, the configuration information may include an identifier that identifies rack device 220 and/or server device 230. For example, the identifier may include one or more letters, numbers, symbols, or the like. In some implementations, the configuration information may specify, via the identifier, which server devices 230, of the set of server devices 230, are to be dedicated to the task. Additionally, or alternatively, the configuration information may specify a quantity of server devices 230 to be dedicated to the task, and source device 210 may determine server devices 230 based on the quantity.

In some implementations, the configuration information may include a set of instructions (e.g., a program) necessary for server device 230 and/or rack device 220 to perform a given task (e.g., to perform orchestration, management, networking, to run a hypervisor, etc.). For example the configuration information may include a software program, an operating system, or the like. Additionally, or alternatively, the configuration information may include information associated with a virtual machine (e.g., a hypervisor). For example, the configuration information may include an operating system and/or hypervisor software that allows server device 230 to act as a virtual machine.

In some implementations, the configuration information may include software for the operation and/or management of server devices 230. For example, the configuration information may include a network security system (e.g., a firewall), a process for distributing workloads across multiple server devices 230 (e.g., a load balancer), a process for managing a domain name store ("DNS"), information for a graphical user interface ("GUI"), or the like.

In some implementations, the configuration information may include information for provisioning a virtual local area network ("VLAN"). For example, the configuration information may include software for establishing and/or operating the VLAN. Additionally, or alternatively, the configuration information may include information that identifies which server devices 230, of the set of server devices 230, are to be part of the VLAN. In some implementations, the configuration information may include information for provisioning a set of VLANs, and may include information that identifies which server devices 230, of the set of server devices 230, are to be associated with a VLAN, of the set of VLANs.

In some implementations, the configuration information may include information based on user input. For example, a user of source device 210 may provide user input (e.g., via a user interface associated with source device 210) to source device 210. In some implementations, the user input may identify a quantity of server devices 230 to be dedicated to a task. Based on the user input, source device 210 may determine which server devices 230, of the set of server devices 230, to dedicate to the task. Additionally, or alternatively, the user information may identify which server devices 230, of the set of server devices 230, to dedicate to the task.

As further shown in FIG. 4A, process 400 may include activating a first server device, of the set of server devices, based on the activation information (block 430). For example, source device 210 may activate first server device 230-1 by installing a program (e.g., software, an operating system, etc.) on first server device 230-1.

In some implementations, source device 210 may activate first server device 230-1 by use of a network booting mechanism, such as PXE. For example, first server device 230-1 may request, via DHCP, a first IP address to be associated with first server device 230-1, and a second IP address associated with source device 210 (e.g., a boot server IP address). Source device 210 may provide the first IP address and the second IP address to first server device 230-1. First server device 230-1 may request, via DHCP, a filename associated with a kernel (e.g., a program that manages computer tasks, such as memory and/or processing). Source device 210 may provide the filename to first server device 230-1, and first server device 230-1 may download the kernel by use of TFTP, extended TFTP, or the like. First server device 230-1 may store the kernel in memory (e.g., memory 330). First server device 230-1 may execute the kernel. In this manner, source device 210 may activate first server device 230-1 without the use of an operating system (e.g., first server device 230-1 may boot up without a pre-installed operating system).

As further shown in FIG. 4A, process 400 may include providing the activation information and the configuration information to the first server device (block 440). For example, source device 210 may provide the activation information and the configuration information to first server device 230-1. First server device 230-1 may store the activation information and the configuration information in a data structure associated with first server device 230-1.

Although FIG. 4A shows example blocks of process 400, in some implementations, process 400 may include additional blocks, different blocks, fewer blocks, and/or differently arranged blocks than those depicted in FIG. 4A. Additionally, or alternatively, one or more of the blocks of process 400 may be performed in parallel. Further, one or more blocks may be omitted in some implementations.

Figure 4B:
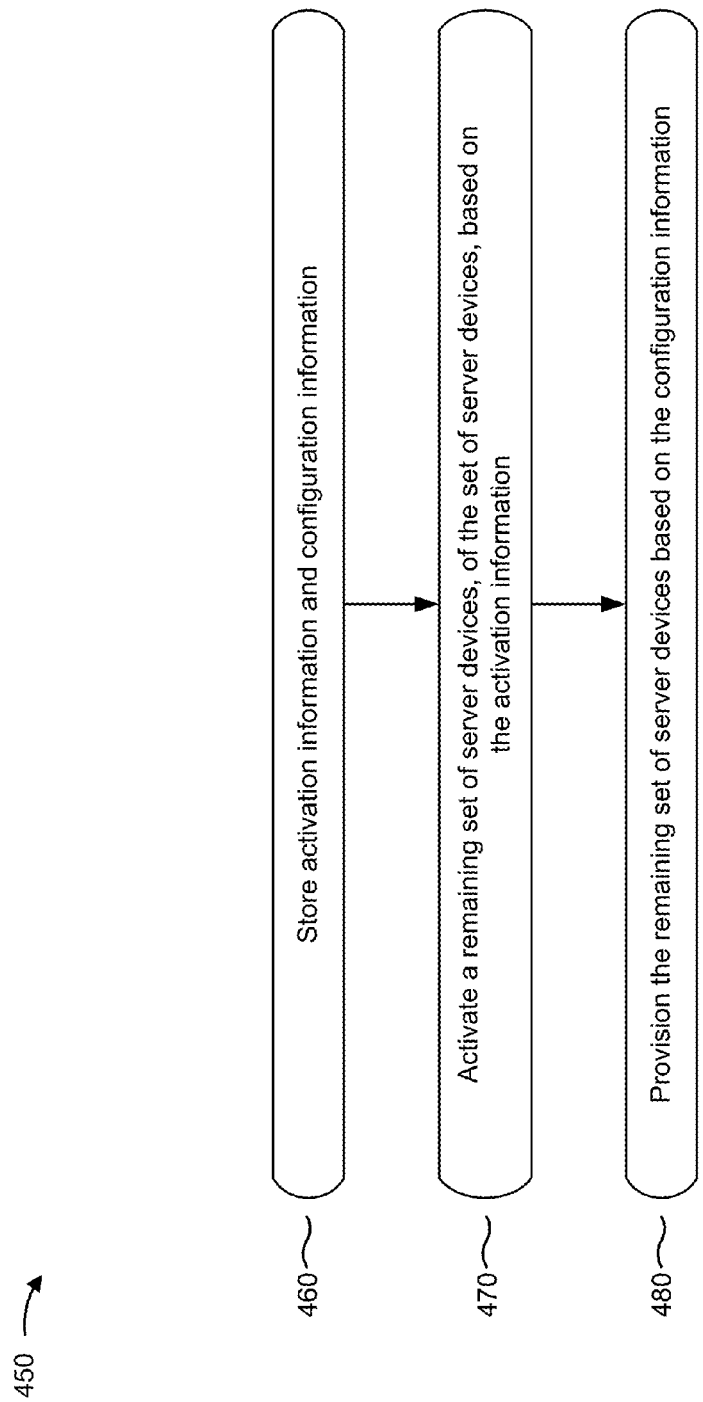

FIG. 4B is a flow chart of an example process 450 for activating and configuring a server device, as performed by a first server device 230-1. In some implementations, one or more process blocks of FIG. 4B may be performed by first server device 230-1. Additionally, or alternatively, one or more process blocks of FIG. 4B may be performed by another device or group of devices separate from or including first server device 230-1, such as source device 210, rack device 220, and/or another server device 230, of the set of server devices 230.

As shown in FIG. 4B, process 450 may include storing activation information and configuration information (block 460). For example, first server device 230-1 may receive the activation information and the configuration information from source device 210, and may store the activation information and the configuration information in a data structure associated with first server device 230-1.

As further shown in FIG. 4B, process 450 may include activating a remaining set of server devices, of the set of server devices, based on the activation information (block 470). For example, first server device 230-1 may activate remaining server devices 230, of the set of server devices 230, based on the activation information (e.g., first server device 230-1 may activate a second server device 230-2, a third server device 230-3, etc.). In some implementations, the set of server device 230 may be associated with rack device 220 (e.g., first server device 230-1 may activate all remaining server devices 230 associated with rack device 220). Additionally, or alternatively, first server device 230-1 may activate a subset of server devices 230 associated with rack device 220.

In some implementations, first server device 230-1 may activate remaining server devices 230 by use of PXE. For example, first server device 230-1 may use PXE to initialize remaining server devices 230. Additionally, or alternatively first server device 230-1 may install an operating system, software, or the like, to allow remaining server devices 230 to operate. In some implementations, first server device 230-1 may activate remaining server devices 230 sequentially. For example, first server device 230-1 may activate a second server device 230-2, a third server device 230-3, a fourth server device 230-4, and so forth.

In some implementations, first server device 230-1 may activate remaining server devices 230 based on the configuration information. For example, the configuration information may identify a first subset of remaining server devices 230 (e.g., a fourth server device 230-4 and a seventh server device 230-7) to be dedicated to a first use (e.g., storage management). The configuration information may identify a second subset of remaining server devices 230 (e.g., a sixth server device 230-6 and a ninth server device 230-9) to a second use (e.g., orchestration). Based on the configuration information, first server device 230-1 may activate the first subset of server devices 230 to be dedicated to the first use (e.g., fourth server device 230-4 and seventh server device 230-7), and may activate the second subset of server device 230 to be dedicated to the second use (e.g., sixth server device 230-6 and ninth server device 230-9). In this manner, first server device 230-1 may activate remaining server devices 230 based on whether remaining server devices are dedicated to orchestration, storage management, virtual machines, or the like.

In some implementations, first server device 230-1 may activate remaining server devices 230 as a chain of activations. For example, first server device 230-1 may activate a second server device 230-2, second server device 230-2 may activate a third server device 230-3, third server device may activate a fourth server device 230-4, and so forth. In some implementations, first server device 230-1 may provide the activation and/or the configuration information to second server device 230-2 (e.g., after second server device 230-2 is activated), second server device 230-2 may provide the activation information and/or the configuration information to third server device 230-3 (e.g., after third server device 230-3 is activated), and so forth. Additionally, or alternatively, first server device 230-1 may store the activation information and/or the configuration information on a data structure (e.g., storage device 340), and remaining storage devices 230 may access the activation information and the configuration information (e.g., via a VLAN).

In some implementations, first server device 230-1 may activate a portion of rack device 220. For example, first server device 230-1 may activate a subset of server devices 230, of a set of server devices 230, associated with rack device 220. Additionally, or alternatively, first server device 230-1 may activate all of rack device 220 (e.g., all server devices 230 associated with rack device 220).

In some implementations, first server device 230-1 may activate two or more server devices 230 in parallel. For example, first server device 230-1 may activate a second server device 230-2 and a third server device 230-3 at substantially the same time (e.g., by booting second server device 230-2 and third server device 230-2 at substantially the same time, by installing software on second server device 230-2 and third server device 230-3 at substantially the same time, etc.).

In some implementations, first server device 230-1 may activate a second server device 230-2 associated with a second set of server devices 230 (e.g., a second rack device 220-2). For example, first server device 230-1 may provide the activation information and the configuration information to second server device 230. Based on the activation information and the configuration information, second server device 230-2 (e.g., associated with the second set of server devices 230) may activate and configure the second set of server devices (e.g., second rack device 220).

In some implementations, first server device 230 may provide the activation information and the configuration information to second server device 230 (e.g., associated with the second set of server devices 230) to allow the second set of server devices 230 to be configured similar to the set of server devices 230 (e.g., with a similar quantity and/or arrangement of server devices 230 dedicated to orchestration, storage management, virtual machines, etc.). Additionally, or alternatively, first server device 230-1 may receive second configuration information (e.g., information that identifies a configuration for the second set of server devices 230 that differs from a configuration of the set of server devices 230), and may provide the second configuration information to second server device 230-2. Second server device 230-2 may configure the second set of server devices 230-1 based on the second configuration information.

As further shown in FIG. 4B, process 450 may include provisioning the remaining set of server devices based on the configuration information (block 480). For example, first server device 230-1 may provision remaining server devices 230 associated with rack device 220.

In some implementations, first server device 230-1 may provision the remaining server devices by use of one or more VLANs. For example, first server device 230-1 may provision a first VLAN, a second VLAN, and so forth. A first portion of remaining server devices 230 may be associated with the first VLAN, and may communicate via the first VLAN. The first VLAN (e.g., the first portion of remaining server devices 230-1) may be dedicated to a first task (e.g., orchestration). Likewise, the second VLAN may be associated with a second portion of remaining server devices 230, and may be dedicated to a second task (e.g., storage management). In this manner, first server device 230-1 may provision remaining server devices 230.

In some implementations, first server device 230-1 may provision remaining server devices 230 by installing a program on remaining server devices 230. For example, first server device 230-1 may install an operating system, necessary for a task, on remaining server devices 230 (e.g., an operating system for orchestration, an operating system for management, an operating system for a hypervisor, etc.). Additionally, or alternatively, first server device 230-1 may install software, necessary for the task, on remaining server devices 230 (e.g., software for orchestration, software for management, software for a virtual machine, etc.). Based on the operating system and/or software, remaining server devices 230 may perform the task provisioned.

In some implementations, first server device 230-1 may provision remaining server devices 230 by installing information necessary to operate remaining server devices 230 as a virtual machine. For example, first server device 230-1 may install an operating system on remaining server devices 230. First server device 230-1 may install a hypervisor on remaining server devices 230 (e.g., software that allows the remaining server devices 230 to act as a virtual machine). In some implementations, first server device 230-1 may install one or more virtual machines on remaining server devices 230 (e.g., software to operate remaining server devices 230 as a virtual machine according to an allocated task, such as orchestration, storage management, etc.).

In some implementations, first server device 230-1 may install software for operating and/or managing server device 230. For example, first server device 230-1 may install a network security system (e.g., a firewall), a process for distributing workloads across multiple server devices 230 (e.g., a load balancer), a process for managing a domain name store ("DNS"), information for a graphical user interface ("GUI"), or the like.

In some implementations, first server device 230-1 may allocate the amount of storage to be dedicated to a task (e.g., orchestration, management, storage, etc.). For example, first server device 230-1 may allocate a set of storage devices 340 to the task (e.g., the set of storage devices 340 associated with a set of server devices 230). Additionally, or alternatively, first server device 230-1 may allocate an amount of storage capacity to the task (e.g., 100 gigabits, 50 gigabytes, etc.).

In some implementations, server devices 230 may receive additional information (e.g., additional software, additional hypervisors, additional operating systems, etc.) from source device 210. Additionally, or alternatively, server devices 230 may receive additional information from another device and/or group of devices (e.g., such as a computing device, a server device, etc.) via a network, such as the Internet. For example, server devices 230 may receive the additional information by use of a hypertext transfer protocol ("HTTP"), a transmission control protocol ("TCP"), a user delivered protocol ("UDP"), or the like.

In some implementations, a second server device 230-2, of the set of server devices 230, may provision first server device 230-1. For example, second server device 230-2 may install necessary information (e.g., an operating system, software, etc.) on to first server device 230-1 for first server device 230-1 to perform a task (e.g., orchestration, management, networking, etc.). In this manner, the set of server devices 230 may be provisioned.

Although FIG. 4B shows example blocks of process 450, in some implementations, process 450 may include additional blocks, different blocks, fewer blocks, and/or differently arranged blocks than those depicted in FIG. 4B. Additionally, or alternatively, one or more of the blocks of process 450 may be performed in parallel. Further, one or more blocks may be omitted in some implementations.

Figure 5A:
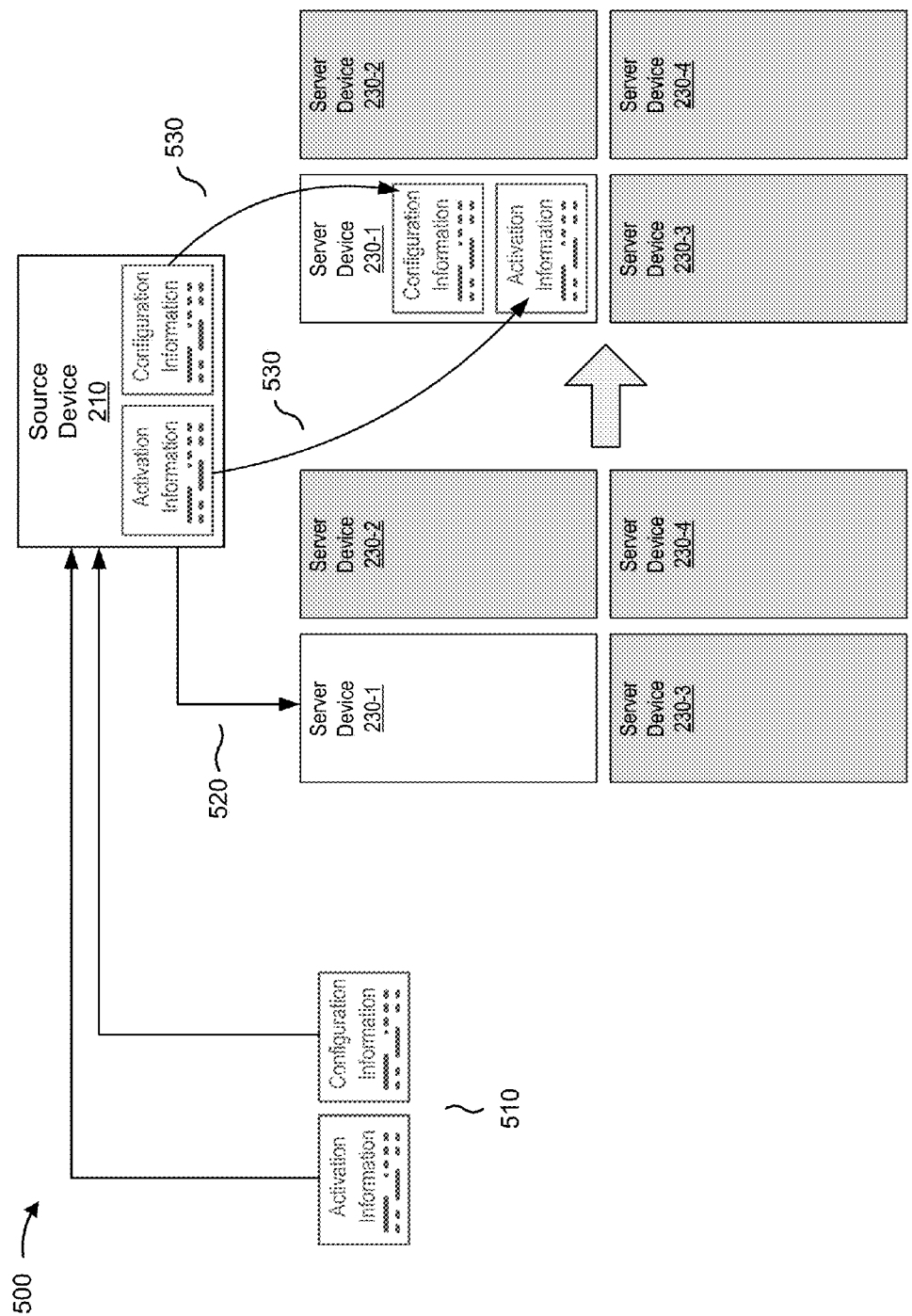
FIGS. 5A-5B are diagrams of an example implementation relating to the example processes shown in FIGS. 4A-4B.
Figure 5B:
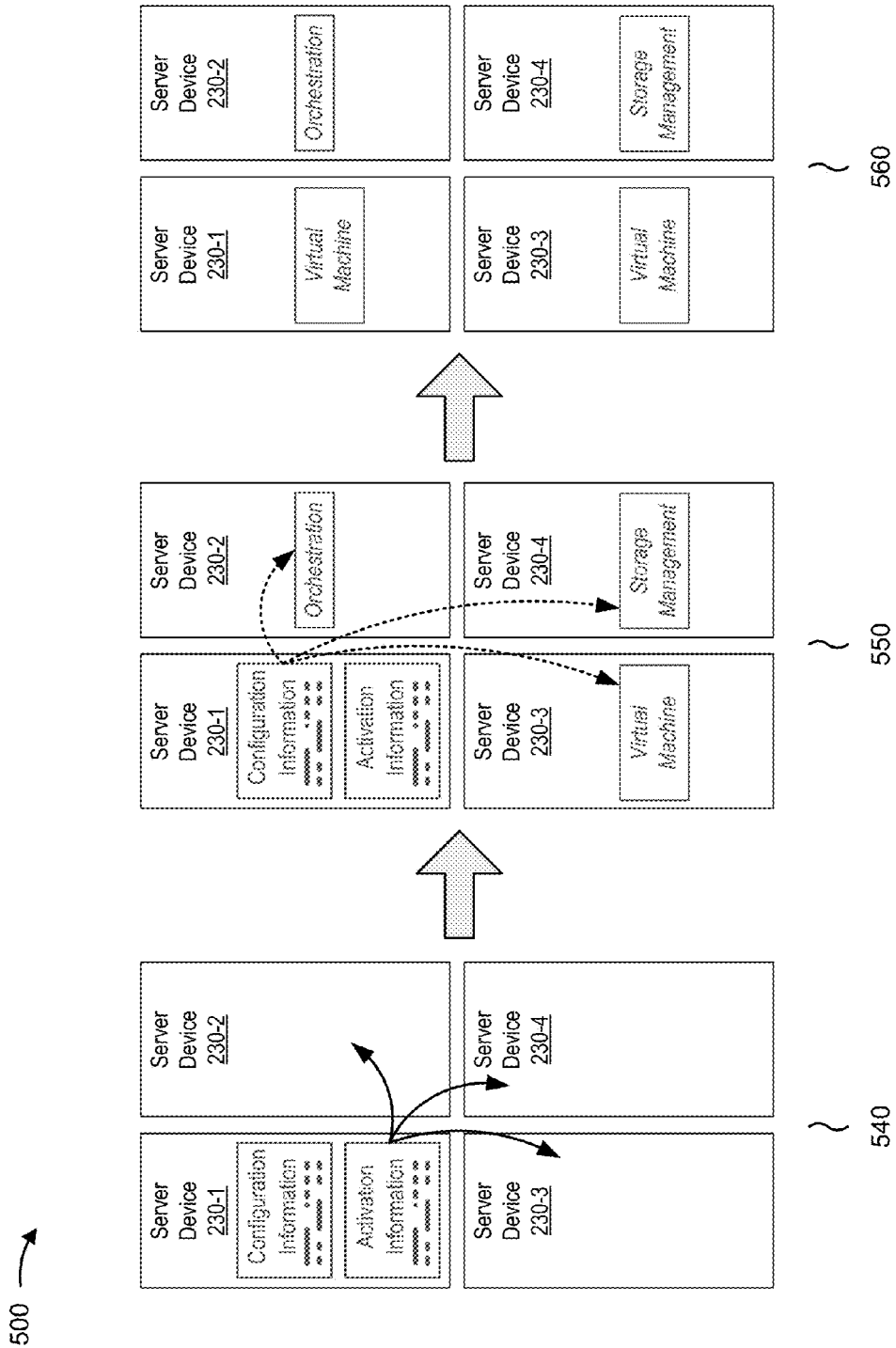

FIGS. 5A-5B are diagrams of an example implementation 500 relating to processes 400 and 450 (FIGS. 4A and 4B). In example implementation 500, source device 210 may activate a first server device 230-1, and first server device 230-1 may activate and configure a second server device 230-2, a third server device 230-3, and a fourth server device 230-4. Once activated and configured, server devices 230 may form a cluster of server devices 230 (e.g., a data center).

As shown in FIG. 5A, and by reference number 510, source device 210 may receive activation information and configuration information. The activation information may include information for activating server devices 230 via PXE (e.g., boot information). Assume, for example implementation 500, the configuration information includes information for configuring server devices 230 to perform a set of tasks, and includes information (e.g., an operating system, software, etc.) for provisioning second server device 230-2 to handle orchestration, third server device 230-2 to act as a virtual machine (e.g., a hypervisor), and fourth server device 230-4 to perform storage management. Source device 210 may store the activation information and the configuration information.

As shown by reference number 520, source device 210 may activate first server device 230-1. Source device 210 may use PXE to initialize first server device 230-1, and may install an operating system and software necessary for first server device 230-1 to function. As shown by reference number 530, source device 210 may provide the activation information and the configuration information to first server device 230-1. First server device 230-1 may store the activation information and the configuration information in a data structure associated with first server device 230-1.

As shown in FIG. 5B, and by reference number 540, first server device 230-1 may activate remaining server devices 230 based on the activation information. For example, first server device 230-1 may activate second server device 230-2 via PXE, may activate third server device 230 via PXE, and may activate fourth server device 230-4 via PXE.

As shown by reference number 550, first server device 230-1 may provision remaining server devices 230 based on the configuration information. First server device 230-1 may provision second server device 230-2 to handle orchestration by installing an orchestration operating system and orchestration software. First server device 230-1 may provision third server device 230-3 to act as a virtual machine by installing a hypervisor operating system and hypervisor software. First server device 230-1 may provision fourth server device 230-4 to handle storage management by installing a storage management operating system and storage management software. Additionally, first server device 230-1 may provision a VLAN, and may allocate server devices 230 as members of the VLAN.

As shown by reference number 560, first server device 230-1 may be provisioned as a virtual machine. For example, second server device 230-2 may install the hypervisor operating system and hypervisor storage on first server device 230-1 based on the configuration information (e.g., based the configuration information stored on a data structure accessible to second server device 230-2). In this manner, server devices 230 may operate as a cluster of server devices 230 (e.g., a data center).

As indicated above, FIGS. 5A-5B are provided merely as an example. Other examples are possible and may differ from what was described with regard to FIGS. 5A-5B.

Figure 6A:
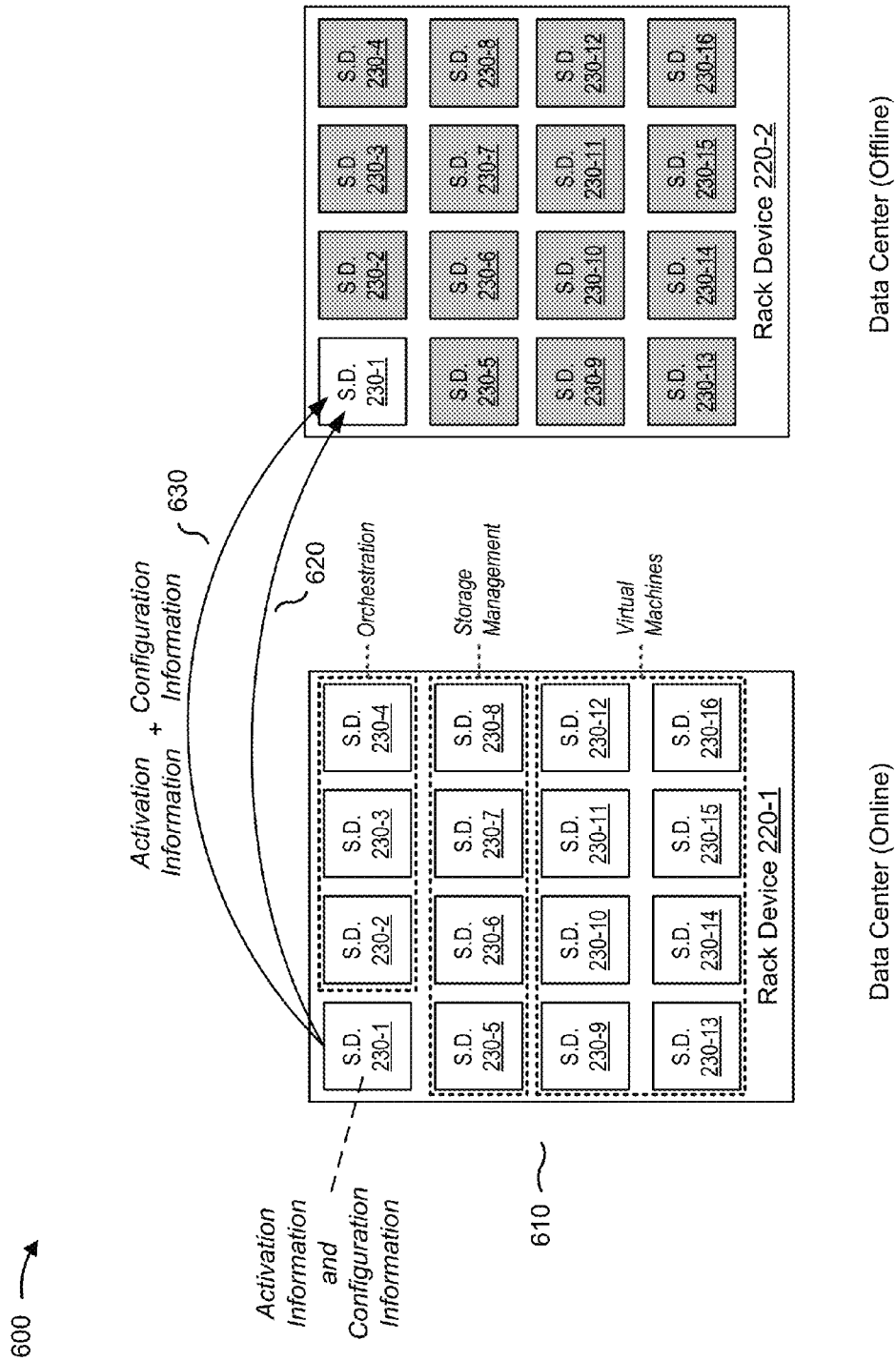
FIGS. 6A-6C are diagrams of another example implementation relating to the example process shown in FIG. 4B.
Figure 6B:
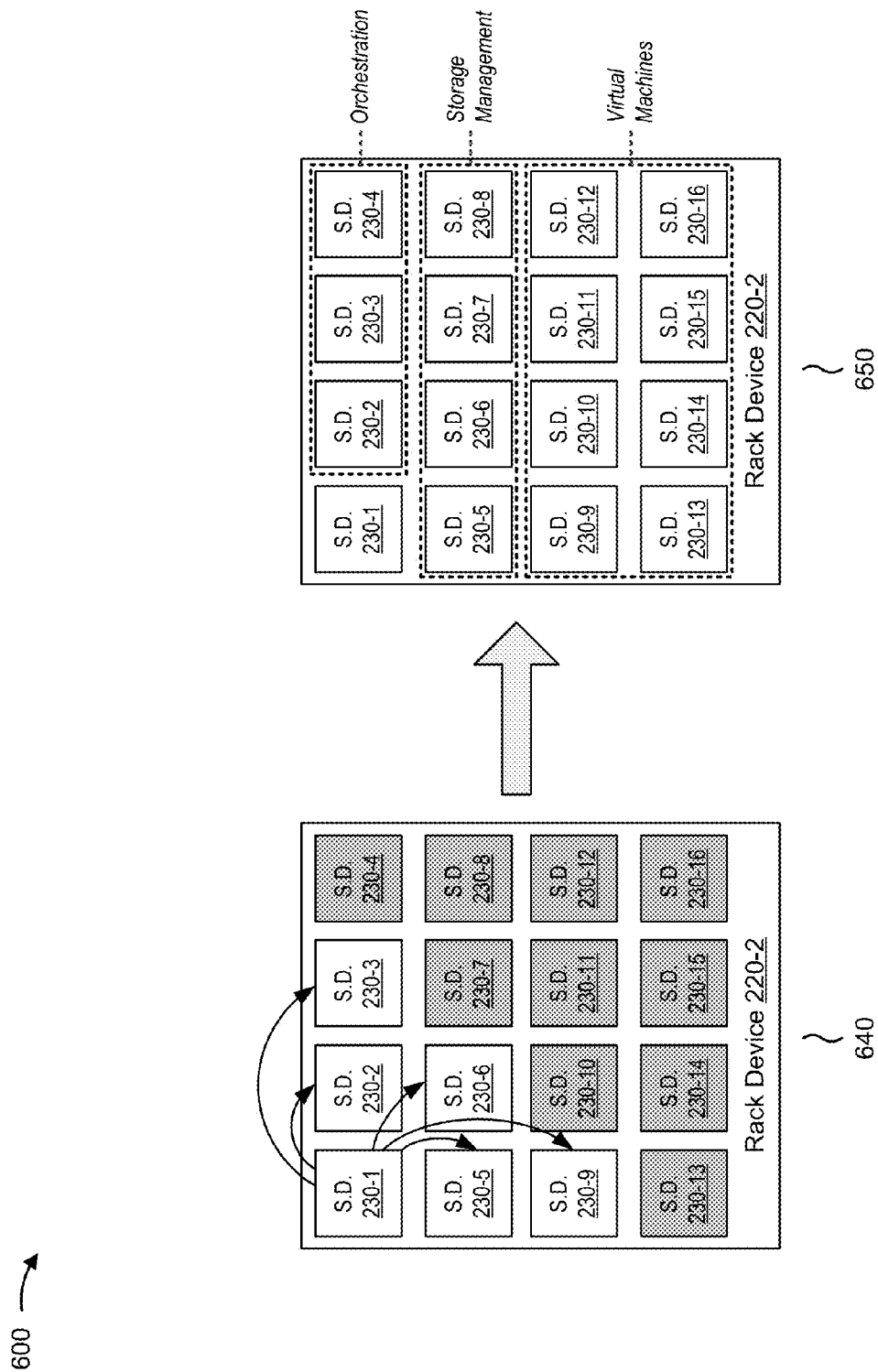
Figure 6C:
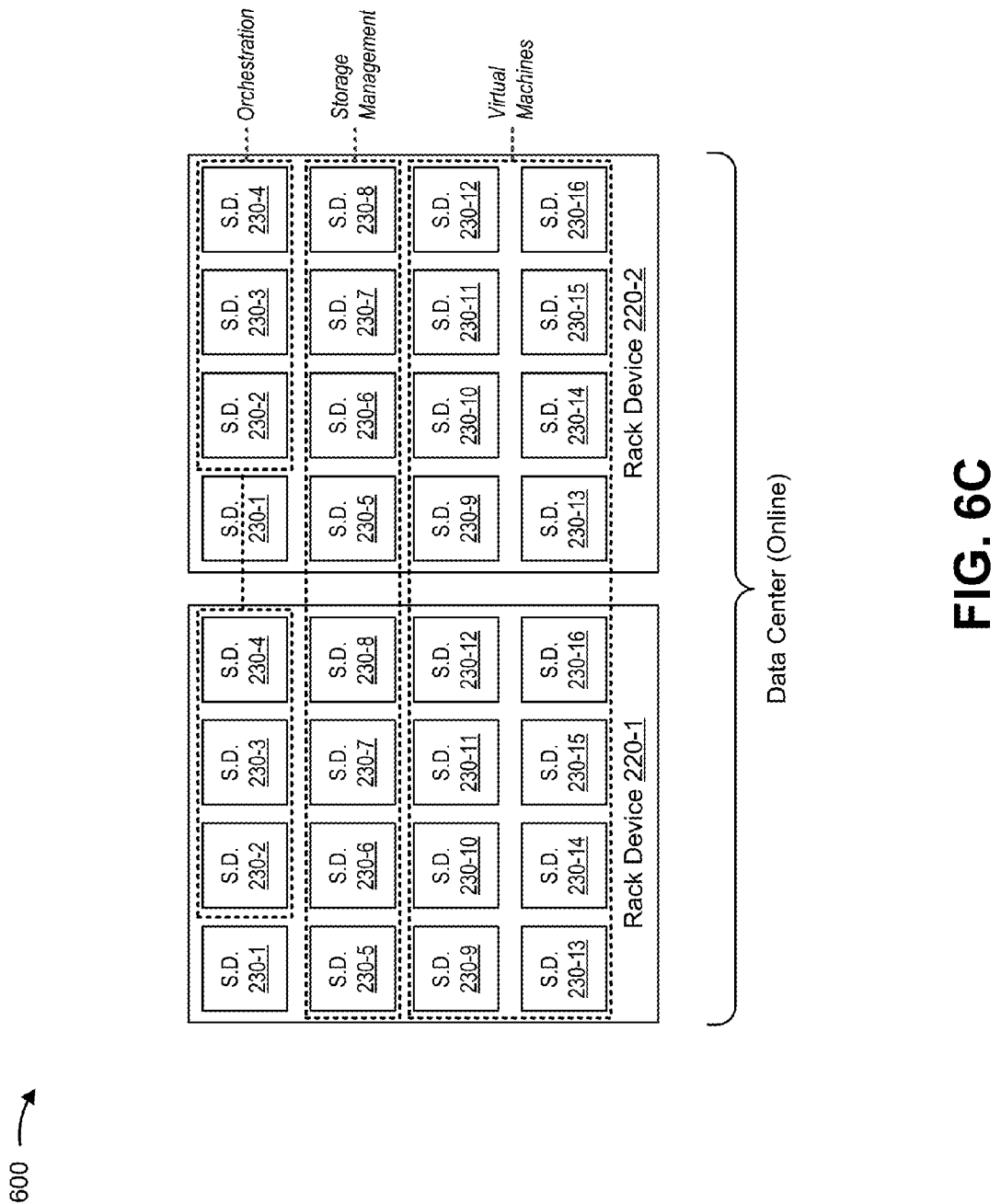

FIGS. 6A-6C are diagrams of an example implementation 600 relating to process 450 (FIG. 4B). In example implementation 600, a first rack device 220-1 may include an operating data center. First rack device 220-1 may activate and configure a second rack device 220-2 to act as an additional data center.

As shown in FIG. 6A, and by reference number 610, first rack device 220-1 may include a set of server devices 230 (e.g., a first server device 230-1 through a sixteenth server device 230-16). Server devices 230 may be configured with a subset of server devices 230 to manage orchestration, a subset of server devices 230 to handle storage management, and a subset of server devices 230 to act as virtual machines (e.g., hypervisors). First server device 230-1 (e.g., "S.D. 230-1") may be associated with activation information and configuration information.

As shown by reference number 620, first server device 230-1 (e.g., associated with first rack device 220-1) may activate first server device 230-1 associated with second rack device 220-2 based on the activation information. As shown by reference number 630, first server device 230-1 (e.g., associated with first rack device 220-1) may provide the activation information and configuration information to first server device 230-1 associated with second rack device 220-2. First server device 230-1 (e.g., associated with second rack device 220-2) may store the activation information and the configuration information (e.g., in a data structure associated with rack device 220-2).

As shown in FIG. 6B, and by reference number 640, first server device 230-1 (e.g., associated with second rack device 220-2) may activate remaining server devices 230 associated with second rack device 220 based on the activation information. As shown by reference number 650, first server device 230-1 (e.g., associated with second rack device 220-2) may provision remaining server devices 230 associated with second rack device 220-2 based on the configuration information. Server devices 230 (e.g., associated with second rack device 220-2) may be dedicated to a task (e.g., orchestration, storage management, virtual machines, etc.).

As shown in FIG. 6C, first rack device 220-1 and second rack device 220-2 may be combined to form a single data center. A set of server devices 230 (e.g., server devices 230-2 ... 230-4) associated with first rack device 220-1 and a set of server devices 230 (e.g., server devices 230-2 ... 230-4) associated with second rack device 220-2 may be dedicated to orchestration. A set of server devices 230 (e.g., server devices 230-5 ... 230-8) associated with first rack device 220-1 and a set of server devices 230 (e.g., server devices 230-5 ... 230-8) associated with second rack device 220-2 may be dedicated to storage management. A set of server devices 230 (e.g., server devices 230-9 ... 230-16) associated with first rack device 220-1 and a set of server devices 230 (e.g., server devices 230-9 ... 230-16) associated with second rack device 220-2 may act as virtual machines. In this manner, first rack device 220-1 may add second rack device 220-2 to a data center without the use of source device 210.

As indicated above, FIGS. 6A-6C are provided merely as an example. Other examples are possible and may differ from what was described with regard to FIGS. 6A-6C.

Figure 7:
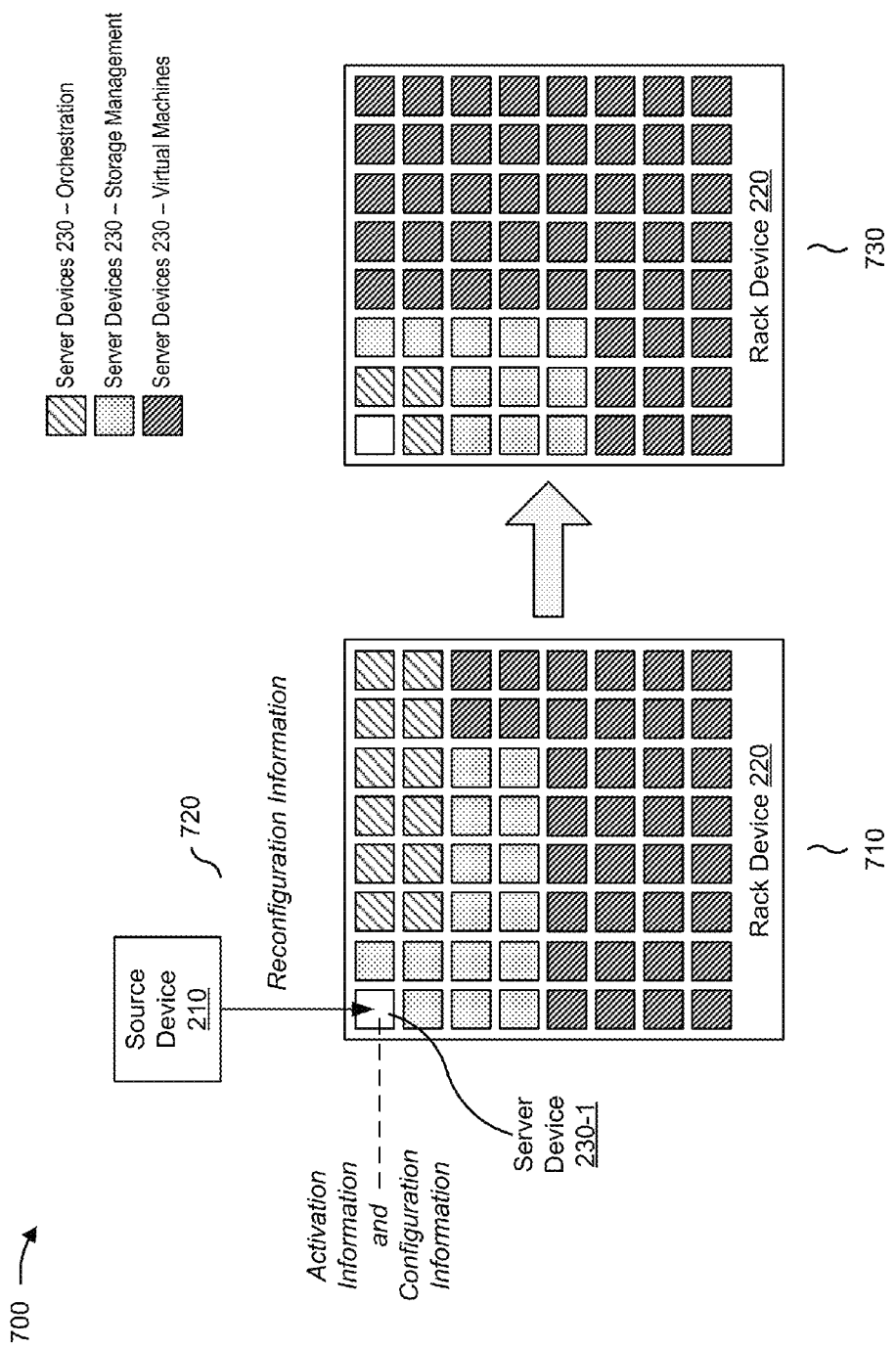
FIG. 7 is a diagram of yet another example implementation relating to the example process shown in FIG. 4B.

FIG. 7 is a diagram of an example implementation 700 relating to process 450 (FIG. 4B). In example implementation 700, a rack device 220 may reconfigure a set of server devices 230 based on reconfiguration information.

As shown by reference number 710, rack device 220 may include a set of server devices 230. A first subset of server devices 230 may be dedicated to orchestration, a second subset of server devices 230 may be dedicated to storage management, and a third subset of storage devices 230 may act as virtual machines. Rack device 220 may include a first server device 230-1. First server device 230-1 may be associated with activation information and configuration information (e.g., activation information and configuration information used to activate and configure rack device 220).

As shown by reference number 720, first server device 230-1 may receive reconfiguration information. The reconfiguration information may include information that identifies how server devices 230 are to be reconfigured (e.g., what server devices 230, of the set of server devices 230, are to be used for orchestration, storage management, virtual machines, etc.). The reconfiguration information may differ from the configuration information associated with first server device 230-1 (e.g., the reconfiguration information may provide for a different configuration of server devices 230 than an original configuration).

As shown by reference number 730, first server device 230-1 may reconfigure server devices 230 based on the reconfiguration information. In some implementations, first server device 230-1 may erase information associated with server devices 230 (e.g., may wipe memory devices 330 associated with server devices 230, may wipe storage devices 340 associated with server devices 230, etc.). First server device 230-1 may use the activation information to activate server devices 230, and may use the reconfiguration information to reconfigure server devices 230. Additionally, or alternatively, first server device 230-1 may reconfigure server devices 230 without erasing information associated with server devices 230. For example, first server device 230-1 may reconfigure server devices 230 by installing an operating system, software, or the like associated with the reconfiguration.

As further shown by reference number 730, first server device 230-1 may provision a greater quantity of server devices 230 to act as virtual machines (e.g., a quantity greater than a quantity of server devices 230, acting as virtual machines, in an initial configuration), and a lesser quantity of server devices 230 dedicated to orchestration and/or storage management (e.g., as compared to the initial configuration). In this manner, rack device 220 may reconfigure the data center based on reconfiguration information.

As indicated above, FIG. 7 is provided merely as an example. Other examples are possible and may differ from what was described with regard to FIG. 7.

Implementations described herein may allow a data center to be activated and configured with minimal activation by a source device. Further, the implementations described herein may allow additional devices (e.g., server devices, rack devices, etc.) to be added to the data center without the use of the source device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A first server device, of a plurality of server devices, in a cloud computing environment, the first server device comprising:
one or more processors to:
receive activation information, associated with the plurality of server devices in the cloud computing environment, to cause the first server device, of the plurality of server devices, to be activated based on the activation information,
the activation information being received from a source device,
the activation information including information for activating the plurality of server devices;
receive configuration information associated with the plurality of server devices,
the configuration information being received from the source device,
the configuration information including information for configuring at least one server device, of the plurality of server devices, to act as a hypervisor;
activate at least one other server device, of the plurality of server devices, based on the activation information; and
configure the at least one other server device based on the configuration information.

2. The first server device of claim 1, where the one or more processors, when receiving configuration information, are further to:
receive user input that identifies a task the at least one other server device is to perform; and
where the one or more processors, when configuring the at least one other server device, are further to:
configure the at least one other server device to perform the task.

3. The first server device of claim 1, where the one or more processors are further to:
receive reconfiguration information,
the reconfiguration information including information for reconfiguring the plurality of server devices,
the plurality of server devices being previously configured; and
reconfigure the at least one other server device based on the reconfiguration information.

4. The first server device of claim 1, where the one or more processors, when receiving the configuration information, are further to:
receive information for configuring the first server device;
where the one or more processors are further to:
provide the information for configuring the first server device to a second server device, of the plurality of server devices, to cause the second server device to configure the first server device.

5. The first server device of claim 1, where the one or more processors, when configuring the at least one other server device, are further to at least one of:
configure the at least one other server device to manage orchestration information,
configure the at least one other server device to manage storage information; or
configure the at least one other server device to act as a virtual machine.

6. The first server device of claim 1, where the plurality of server devices is a first plurality of server devices;
where the activation information is first activation information;
where the configuration information is first configuration information;
where the one or more processors, when receiving the first activation information, are further to:
receive second activation information associated with a second plurality of server devices in the cloud computing environment;
where the one or more processors, when receiving the first configuration information, are further to:
receive second configuration information associated with the second plurality of server devices; and
where the one or more processors are further to:
activate a second server device, of the second plurality of server devices, based on the second activation information;
provide the second activation information and the second configuration information to the second server device to cause the second server device to activate and configure at least one other server device, of the second plurality of server devices,
the activating the at least one other server device, of the second plurality of server devices, being based on the second activation information,
the configuring the at least one other server device, of the second plurality of server devices, being based on the second configuration information.

7. The first server device of claim 1, where the one or more processors, when receiving the configuration information, are further to:
determine a subset of the plurality of server devices associated with a task; and
where the one or more processors are further to:
activate the subset of the plurality of server devices based on the activation information and based on the task; and
configure the subset of server devices based on the configuration information and based on the task.

8. A computer-readable medium storing instructions in a cloud computing environment, the instructions comprising:
one or more instructions that, when executed by one or more processors, cause the one or more processors to:
receive activation information, associated with a plurality of server devices in the cloud computing environment, to cause a first server device, of the plurality of server devices, to be activated based on the activation information,
the activation information being received from a source device,
the activation information including information for activating the plurality of server devices;
receive configuration information associated with the plurality of server devices,
the configuration information being received from the source device,
the configuration information including information for configuring at least one server device, of the plurality of server devices, to act as a hypervisor;
activate at least one other server device, of the plurality of server devices, based on the activation information; and
configure the at least one other server device based on the configuration information.

9. The computer-readable medium of claim 8, where the one or more instructions, that cause the one or more processors to receive configuration information, further cause the one or more processors to:
receive user input that identifies a task the at least one other server device is to perform; and where the one or more instructions, that cause the one or more processors to configure the at least one other server device, further cause the one or more processors to:
  configure the at least one other server device to perform the task.

10. The computer-readable medium of claim 8, where the one or more instructions, when executed by the one or more processors, further cause the one or more processors to:
  receive reconfiguration information,
    the reconfiguration information including information for reconfiguring the plurality of server devices,
    the plurality of server devices being previously configured; and
  reconfigure the at least one other server device based on the reconfiguration information.

11. The computer-readable medium of claim 8, where the one or more instructions, that cause the one or more processors to receive the configuration information, further cause the one or more processors to:
  receive information for configuring the first server device;
  where the one or more instructions, when executed by the one or more processors, further cause the one or more processors to:
    provide the information for configuring the first server device to a second server device, of the plurality of server devices, to cause the second server device to configure the first server device.

12. The computer-readable medium of claim 8, where the one or more instructions, that cause the one or more processors to configure the at least one other server device, further cause the one or more processors to at least one of:
  configure the at least one other server device to manage orchestration information,
  configure the at least one other server device to manage storage information; or
  configure the at least one other server device to act as a virtual machine.

13. The computer-readable medium of claim 8, where the plurality of server devices is a first plurality of server devices;
  where the activation information is first activation information;
  where the configuration information is first configuration information;
  where the one or more instructions, that cause the one or more processors to receive the first activation information, further cause the one or more processors to:
    receive second activation information associated with a second plurality of server devices in the cloud computing environment;
  where the one or more instructions, that cause the one or more processors to receive the first configuration information, further cause the one or more processors to:
    receive second configuration information associated with the second plurality of server devices; and
  where the one or more instructions, when executed by the one or more processors, further cause the one or more processors to:
    activate a second server device, of the second plurality of server devices, based on the second activation information;
    provide the second activation information and the second configuration information to the second server device to cause the second server device to activate and configure at least one other server device, of the second plurality of server devices,
      the activating the at least one other server device, of the second plurality of server devices, being based on the second activation information,
      the configuring the at least one other server device, of the second plurality of server devices, being based on the second configuration information.

14. The computer-readable medium of claim 8, where the one or more instructions, that cause the one or more processors to receive the configuration information, further cause the one or more processors to:
  determine a subset of the plurality of server devices associated with a task; and
  where the one or more instructions, when executed by the one or more processors, further cause the one or more processors to:
    activate the subset of the plurality of server devices based on the activation information and based on the task; and
    configure the subset of the plurality of server devices based on the configuration information and based on the task.

15. A method, comprising:
  receiving, by a first server device, of a plurality of server devices, in a cloud computing environment, activation information, associated with the plurality of server devices, in the cloud computing environment, to cause the first server device, of the plurality of server devices, to be activated based on the activation information,
    the activation information being received from a source device,
    the activation information including information for activating the plurality of server devices;
  receiving, by the first server device, configuration information associated with the plurality of server devices,
    the configuration information being received from the source device,
    the configuration information including information for configuring at least one server device, of the plurality of server devices, to act as a hypervisor;
  activating, by the first server device, at least one other server device, of the plurality of server devices, based on the activation information; and
  configuring, by the first server device, the at least one other server device based on the configuration information.

16. The method of claim 15, further comprising:
  receiving, by the first server device, reconfiguration information,
    the reconfiguration information including information for reconfiguring the plurality of server devices,
    the plurality of server devices being previously configured; and
  reconfiguring, by the first server device, the at least one other server device based on the reconfiguration information.

17. The method of claim 15, where receiving the configuration information further comprises:
  receiving information for configuring the first server device;
  the method further comprising:
    providing, by the first server device, the information for configuring the first server device to a second server device, of the plurality of server devices, to cause the second server device to configure the first server device.

18. The method of claim 15, where configuring the at least one other server device further comprises at least one of:
- configuring the at least one other server device to manage orchestration information,
- configuring the at least one other server device to manage storage information; or
- configuring the at least one other server device to act as a virtual machine.

19. The method of claim 15, where the plurality of server devices is a first plurality of server devices;
where the activation information is first activation information;
where the configuration information is first configuration information;
where receiving the first activation information further comprises:
- receiving second activation information associated with a second plurality of server devices in the cloud computing environment;

where receiving the first configuration information further comprises:
- receiving second configuration information associated with the second plurality of server devices; and the method further comprising:
- activating, by the first server device, a second server device, of the second plurality of server devices, based on the second activation information;
- providing, by the first server device, the second activation information and the second configuration information to the second server device to cause the second server device to activate and configure at least one other server device, of the second plurality of server devices,
  - the activating the at least one other server device, of the second plurality of server devices, being based on the second activation information,
  - the configuring the at least one other server device, of the second plurality of server devices, being based on the second configuration information.

20. The method of claim 15, where receiving the configuration information further comprises:
- determining a subset of the plurality of server devices associated with a task; and the method further comprising:
- activating, by the first server device, the subset of the plurality of server devices based on the activation information and based on the task; and
- configuring, by the first server device, the subset of the plurality of server devices based on the configuration information and based on the task.

* * * * *